UNITED STATES PATENT OFFICE.

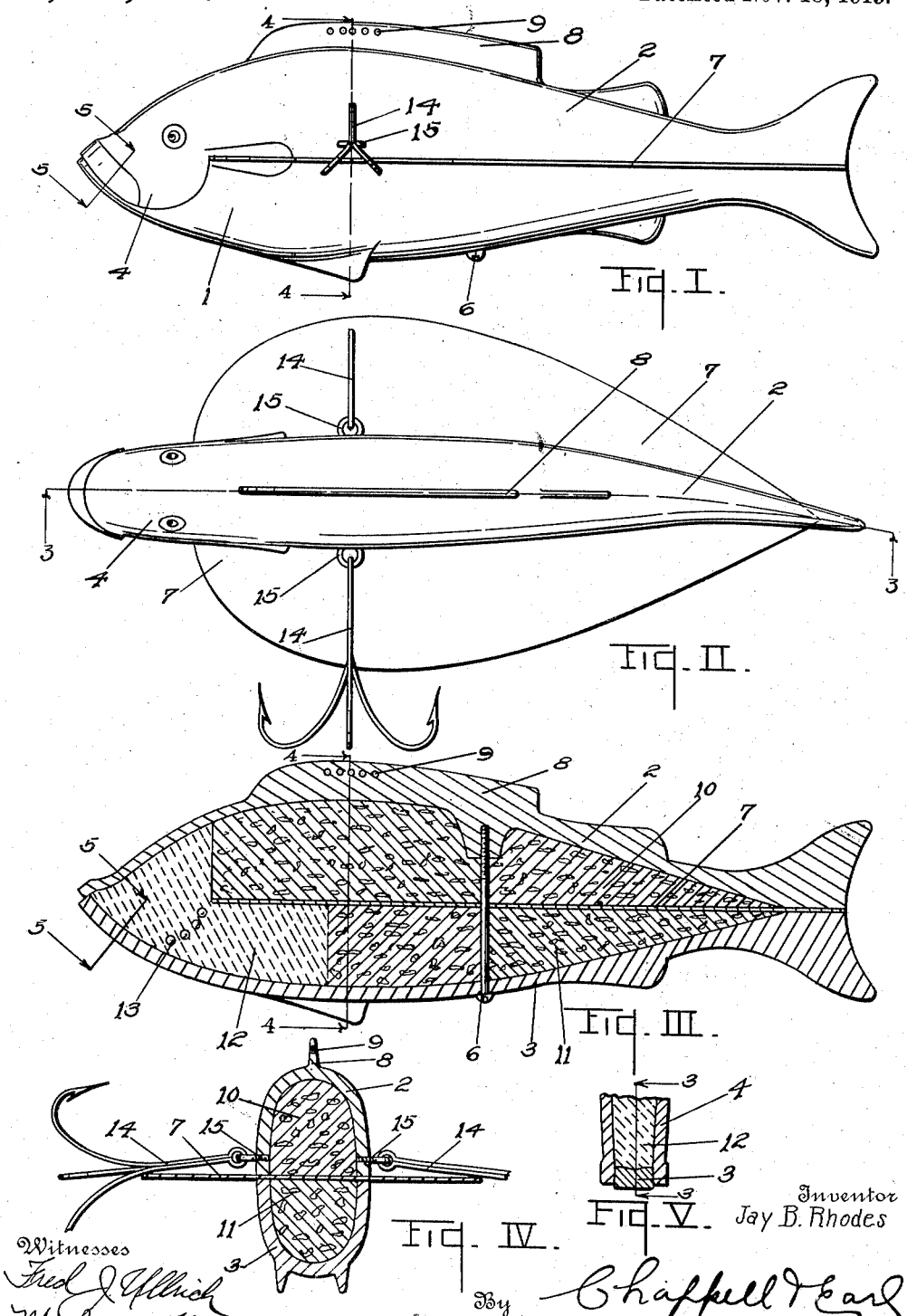

JAY B. RHODES, OF KALAMAZOO, MICHIGAN.

LURE OR DECOY.

1,321,850. Specification of Letters Patent. Patented Nov. 18, 1919.

Application filed March 11, 1919. Serial No. 281,923.

*To all whom it may concern:*

Be it known that I, JAY B. RHODES, a citizen of the United States, residing at the city and county of Kalamazoo and State of Michigan, have invented certain new and useful Improvements in Lures or Decoys, of which the following is a specification.

This invention relates to improvements in lures or decoys.

The main objects of this invention are:

First, to provide an improved fish lure or decoy adapted for use in attracting fish to a point within range of a spear.

Second, to provide an improved fish lure or decoy which may be easily manipulated to give a forward and circuitous movement in the water very similar to a fish swimming idly about.

Third, to provide an improved lure or decoy having these advantages which is lifelike in appearance.

Fourth, to provide an improved lure which is equipped with hooks and the hooks supported in suitable position to receive the strike of a fish.

Fifth, to provide an improved lure the movement of which in the water is largely under the control of the operator.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation view of my improved fish lure.

Fig. II is a plan view, one of the hooks being partially broken away.

Fig. III is a central longitudinal section on a line corresponding to line 3—3 of Fig. II.

Fig. IV is a transverse section on a line corresponding to line 4—4 of Figs. I and III.

Fig. V is a detail section on line corresponding to line 5—5 of Fig. I, showing structural details.

In the drawing similar reference characters refer to similar parts throughout the several views, and the sectional views are taken looking in the direction of the little arrows at the ends of the section lines.

In the embodiment illustrated, the body 1 is made to represent a fish or pisciform and comprises a shell formed of aluminum castings. This shell is horizontally divided, there being a top section 2 and a bottom section 3. The top section 2 has cheek portions 4 at its head overlapping the edges of the bottom section as shown in Fig. 5, facilitating the assembling and securing of the parts, a single screw 6 arranged through the bottom and threaded into the top section being found sufficient to properly secure the parts together. A plate 7 of celluloid or other transparent water resistant material is clamped between the body sections to project at each side thereof forming wings or horizontal fins of substantial area. The rear end of the body is preferably laterally deflected as shown in Fig. II, which causes the lure to take a circuitous course in the water, thus making it especially desirable for use as a decoy in spearing fish where it is desired to attract the fish into range.

The top section is provided with a back fin 8 having a plurality of holes 9 therein so that a line may be attached at different points longitudinally of the body, thereby controlling to some extent the movement of the decoy in the water.

The hollow shell is filled with cork and a weighting material, there being upper and lower sections of cork 10 and 11 arranged in the top and bottom shells and weighting material 12 of putty or other material adapted to contain shot or slugs, as 13, so that the balancing of the body may be regulated as desired.

The body is arranged so that its center of gravity does not coincide with the center of the sustaining area of the side fins, the center of gravity being substantially in front of the center of the sustaining area of the side fins. The line is attached to the back, preferably in front of this center of gravity so that when the lure is suspended or drawn upwardly in the water the body assumes an upwardly inclined position and when lowered in the water the center of gravity causes the body to tilt forwardly so that by manipulating the line by raising and lowering the same the lure is given a forward up and down movement through the water, the speed and stroke of which depends upon the manipulation of the line and the point at which the line is attached to the lure.

By deflecting the tail laterally or providing means such as deflecting fins the movement of the lure is circuitous which gives it the appearance of a minnow or fish swimming idly about. The side wings or fins being transparent are invisible or inconspicuous in the water so that the lure has a very life like appearance.

In the embodiment illustrated the lure is provided with hooks 14 which are secured thereto by the eyes 15 above the side fins so that the shanks of the hook rest upon the side fins and the hooks are supported in proper position to receive the strike of a fish and it is found that even when the lure is used particularly for attracting fish within range of a spear that very frequently a fish will strike the bait and be hooked before it can be speared.

I have illustrated and described my lure in one form in which I have embodied the same in practice. Where the body is formed mainly of wood it is not necessary to provide the cork filler. I have not illustrated or described other adaptations and embodiments which I have made and which I contemplate as I believe the disclosure made will enable those skilled in the art to which my invention relates to embody or adapt the same as may be desired.

Having thus described my invention, what I claim as new and desire to secure by Letters Patent, is:

1. In a lure, the combination of a pisciform body shell having a laterally deflected tail portion and comprising horizontal top and bottom sections, the top section being provided with a back fin having a plurality of holes therein for the attachment of a line and with cheek portions at the head overhanging the edges of the bottom section, a screw disposed through the bottom section and threaded into the top section for detachably securing the sections together, a plate of transparent material clamped between said body sections and projecting from the sides thereof providing side fins, and a filler for said body comprising cork and a weighting material disposed to weight the body so that it is out of balance relative to the center of the sustaining area of its said side fins so that as the lure is raised and lowered in the water by a line attached to said back fin of the lure an up and down forward and circuitous movement is imparted thereto.

2. In a lure, the combination of a pisciform body shell having a laterally deflected tail portion and comprising horizontal top and bottom sections, the top section being provided with a back fin having a plurality of holes therein for the attachment of a line, a plate of transparent material clamped between said body sections and projecting from the sides thereof providing side fins, and a filler for said body comprising cork and a weighting material disposed to weight the body so that it is out of balance relative to the center of the sustaining area of its said side fins so that as the lure is raised and lowered in the water by a line attached to said back fin of the lure an up and down forward and circuitous movement is imparted thereto.

3. In a lure, the combination of a pisciform body shell comprising horizontal top and bottom sections, the top section being provided with cheek portions at the head overhanging the edges of the bottom section, a screw disposed through the bottom section and threaded into the top section for detachably securing the sections together, a plate clamped between said body sections and projecting from the sides thereof providing side fins, and a filler for said body disposed so that the center of gravity of the body and the center of the sustaining area of its said side fins are now coincident.

4. In a lure, the combination of a pisciform body having a laterally deflected tail portion and comprising horizontal top and bottom sections, and a pear-shaped plate of transparent material clamped between said body sections and projecting from the sides thereof and providing rearwardly tapering side fins, the center of gravity of said body and the center of sustaining area of said side fins being non-coincident so that as the lure is raised and lowered in the water by a line attached to the top thereof, an up and down forward circuitous movement is imparted thereto.

5. In a lure, the combination of a body, horizontal transparent side fins, the center of gravity of the body and the center of the sustaining area of said fins in water being non-coincident, hooks secured to said body with their shanks resting on said side fins to project beyond the same, and a line attaching means at the back of said body.

6. In a lure, the combination of a body, horizontal transparent side fins, the center of gravity of the body and the center of the sustaining area of said fins in water being non-coincident, and a line attaching means at the back of said body.

7. In a lure, the combination of a body comprising top and bottom sections, a plate clamped between said body sections and projecting at the sides thereof providing side fins, and hooks secured to said body above said side fins with their shanks normally resting thereon.

8. In a lure, the combination of a body, horizontal side fins, and hooks secured to the sides of said body with their shanks resting on said side fins.

In witness whereof I have hereunto set my hand and seal in the presence of a witness.

JAY B. RHODES. [L. S.]

Witness:
LUELLA G. GREENFIELD.